United States Patent
Pilloff

(10) Patent No.: US 9,020,986 B1
(45) Date of Patent: Apr. 28, 2015

(54) CONFLATING GEOGRAPHIC FEATURE DATA

(75) Inventor: Mark D. Pilloff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 885 days.

(21) Appl. No.: 12/898,353

(22) Filed: Oct. 5, 2010

(51) Int. Cl.
*G01C 21/00* (2006.01)

(52) U.S. Cl.
CPC ................... *G01C 21/005* (2013.01)

(58) Field of Classification Search
USPC .................................. 701/408–533
See application file for complete search history.

(56) References Cited

U.S. PATENT DOCUMENTS

| | | | | |
|---|---|---|---|---|
| 6,101,496 A * | 8/2000 | Esposito | ................ | 701/532 |
| 6,732,046 B1 * | 5/2004 | Joshi | ................ | 701/461 |
| 2003/0016174 A1 * | 1/2003 | Anderson | ................ | 342/378 |
| 2008/0010262 A1 * | 1/2008 | Frank | ................ | 707/3 |
| 2008/0040336 A1 * | 2/2008 | Frank | ................ | 707/4 |
| 2008/0313129 A1 * | 12/2008 | Pschierer et al. | ................ | 707/2 |
| 2012/0136895 A1 * | 5/2012 | Johnson | ................ | 707/776 |

* cited by examiner

*Primary Examiner* — Hosain Alam
*Assistant Examiner* — Reza Hosseini
(74) *Attorney, Agent, or Firm* — Fenwick & West LLP

(57) ABSTRACT

A geometry dataset describing locations of geographic features with high precision and an information dataset describing locations of geographic features with low precision are established. The location of a geometry feature included in the geometry dataset is plotted in a geographic region and the locations of information features included in the information dataset are also plotted. A set of information features having plotted locations bounded by the location of the geometry feature is identified. An information feature in the set is selected based on a comparison of metadata of the geometry feature with metadata of the information feature. Data from the geometry feature and the selected information feature are conflated and the conflated data are stored. The conflated data are used for purposes including providing map data to users of clients.

19 Claims, 5 Drawing Sheets

CONFLATING GEOGRAPHIC FEATURE DATA

BACKGROUND

1. Field of Art

The present invention generally relates to the field of generating maps and specifically to conflating multiple sets of data describing geographic features on the maps.

2. Background of the Invention

Digital maps, such as those provided by GOOGLE INC., are used in a wide variety of electronic devices, such as car navigation systems and mobile phones. Users rely on digital maps to provide comprehensive and accurate information about roads and other geographic features for purposes including navigation, route guidance, and education. Therefore, the map data should be as accurate and complete as possible.

There are large datasets available that describe geographic features and can be used to create digital maps. However, different datasets have different strengths and weaknesses. For example, one dataset may describe locations of geographic features with a high level of precision but contain only partial metadata describing the features. Another dataset, in contrast, may include detailed metadata describing the geographic features but lack precise location information.

It is desirable to create digital maps that incorporate the strengths of their constituent datasets. However, given the large sizes of datasets, properly conflating the data to, e.g., combine the correct metadata with the correct location information, is not an easy task.

SUMMARY

The above and other issues are addressed by a computer-implemented method, non-transitory computer readable medium, and computer system for conflating data describing geographic features. An embodiment of the method comprises establishing first and second datasets describing geographic features within a geographic region and associating a set containing a plurality of geographic features of the second dataset with a geographic feature of the first dataset. The method further comprises selecting a geographic feature from the set corresponding to the geographic feature of the first dataset, conflating data describing the selected geographic feature and data describing the geographic feature of the first dataset to form conflated data, and storing the conflated data.

An embodiment of the non-transitory computer-readable storage medium stores executable computer program instructions for conflating data describing geographic features, the instructions performing steps comprising establishing first and second datasets describing geographic features within a geographic region and associating a set containing a plurality of geographic features of the second dataset with a geographic feature of the first dataset. The steps further comprise selecting a geographic feature from the set corresponding to the geographic feature of the first dataset, conflating data describing the selected geographic feature and data describing the geographic feature of the first dataset to form conflated data, and storing the conflated data.

An embodiment of the computer system for conflating data describing geographic features comprises a non-transitory computer-readable storage medium storing executable computer program instructions. The instructions comprise instructions for establishing first and second datasets describing geographic features within a geographic region and for associating a set containing a plurality of geographic features of the second dataset with a geographic feature of the first dataset. The instructions further comprise instructions for selecting a geographic feature from the set corresponding to the geographic feature of the first dataset, conflating data describing the selected geographic feature and data describing the geographic feature of the first dataset to form conflated data, and storing the conflated data. The computer system also comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
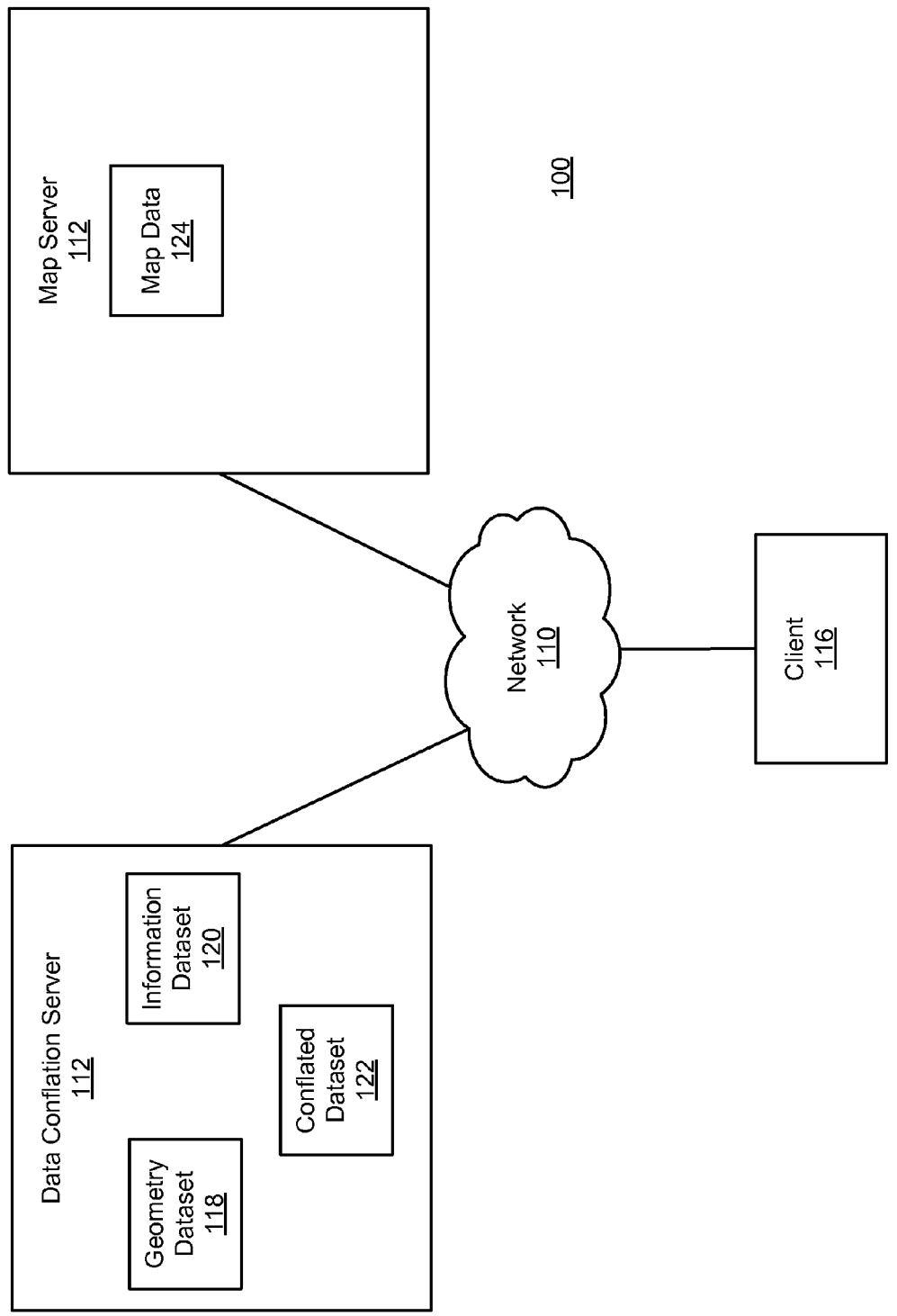
FIG. 1 is a high-level block diagram illustrating an environment for conflating datasets describing geographic features according to one embodiment.

FIG. 1 is a high-level block diagram illustrating an environment 100 for conflating datasets describing geographic features according to one embodiment. As shown, the environment 100 includes a network 110, a data conflation server 112, a map server 114, and a client 116. While only one of each entity is shown in FIG. 1 for clarity, embodiments can have multiple servers 112, 114 and many clients 116.

The network 110 represents the communication pathway between the data conflation server 112, map server 114, and client 116. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The data conflation server 112 conflates (i.e., blends or combines) data from multiple datasets into a conflated dataset. In one embodiment, the datasets describe geographic features such as those contained on maps of the Earth, particularly water features. However, the techniques described herein can also be used with datasets describing other types of features. While the datasets are shown in FIG. 1 as being within the data conflation server 112, in some embodiments the datasets are stored by other servers and accessed by the data conflation server via the network 110.

In general, the data conflation server 112 conflates the data in a way such that the strengths of each constituent dataset are incorporated into the conflated dataset. For purposes of this description, assume that there are two datasets describing geographic features such as rivers, lakes, and canals in a particular geographic region, such as the United States. Each geographic feature in the datasets has a specified location and associated metadata.

One dataset 118, referred to as the "geometry dataset," describes the locations of the geographic features with a high-level of precision. For example, the geometry dataset 118 can use polygons to accurately describe the geometry (e.g., borders) of the geographic features. However, the geometry dataset 118 may contain relatively poor metadata describing the characteristics of the geographic features. For example, the geometry dataset 118 may indicate the type of a particular geographic feature (e.g., a canal), but not indicate the name of the feature. For clarity, the geographic features in the geometry dataset 118 are referred to as "geometry features." An example of the geometry dataset 118 is the National Hydrography Dataset (NHD) available from the United States Geological Survey.

The second dataset 120, referred to as the "information dataset," contains detailed information (i.e., contains detailed metadata) about the geographic features in the same region as the features in the geometry dataset 118. For example, the information dataset 120 can describe the official name of the feature, the type of feature, whether the feature is navigable, alternative names for the feature, historical information about the feature, etc. However, the information dataset 120 may describe the location of the geographic features at a low level of precision. For example, the information dataset 120 may indicate the location of a geographic feature using only a single point. For clarity, the geographic features in the information dataset are referred to as "information features." An example of the information dataset 120 is the Geographic Names Information System available from the United States Geological Survey.

The data conflation server 112 conflates the geometry 118 and information 120 datasets to produce a conflated dataset 122. The conflated dataset 122 reflects the strengths of its constituent datasets. Thus, the conflated dataset 122 specifies the locations of geographic features using the locations from the geometry dataset 118 and includes the metadata about the geographic features from the information dataset 120. To conflate the data for a given geographic feature, an embodiment of the data conflation server 112 uses computational geometry to automatically associate a geometry feature with the set of information features bounded by or near it. The data conflation server 112 uses the metadata available in both datasets to select an information feature from the set that corresponds to the geometry feature, and conflates the location described by the geometry feature with the characteristics described by the metadata of the information feature.

The map server 114 receives the conflated dataset from the data conflation server 112 and serves map data 124 incorporating the conflated dataset 122 to clients 116. The map data 120 describe geographic features within a specified geographic region. For example, the map data can identify cities, states, neighborhoods, roads, water features, businesses, schools, parks, etc.

The client 116 is a computer or other electronic device used by one or more users to perform activities including requesting and receiving map data 124 from the map server 114. For example, the client 116 can be a desktop, notebook, or tablet computer, a mobile telephone, or a navigation device. In some embodiments, the client 116 includes position determination functionality, such as functionality using the Global Positioning System (GPS) and the client can use this functionality to obtain map data for the vicinity of the client. The user of the client 116 can view the map data, including the conflated data produced by the data conflation server 112.

Figure 2:
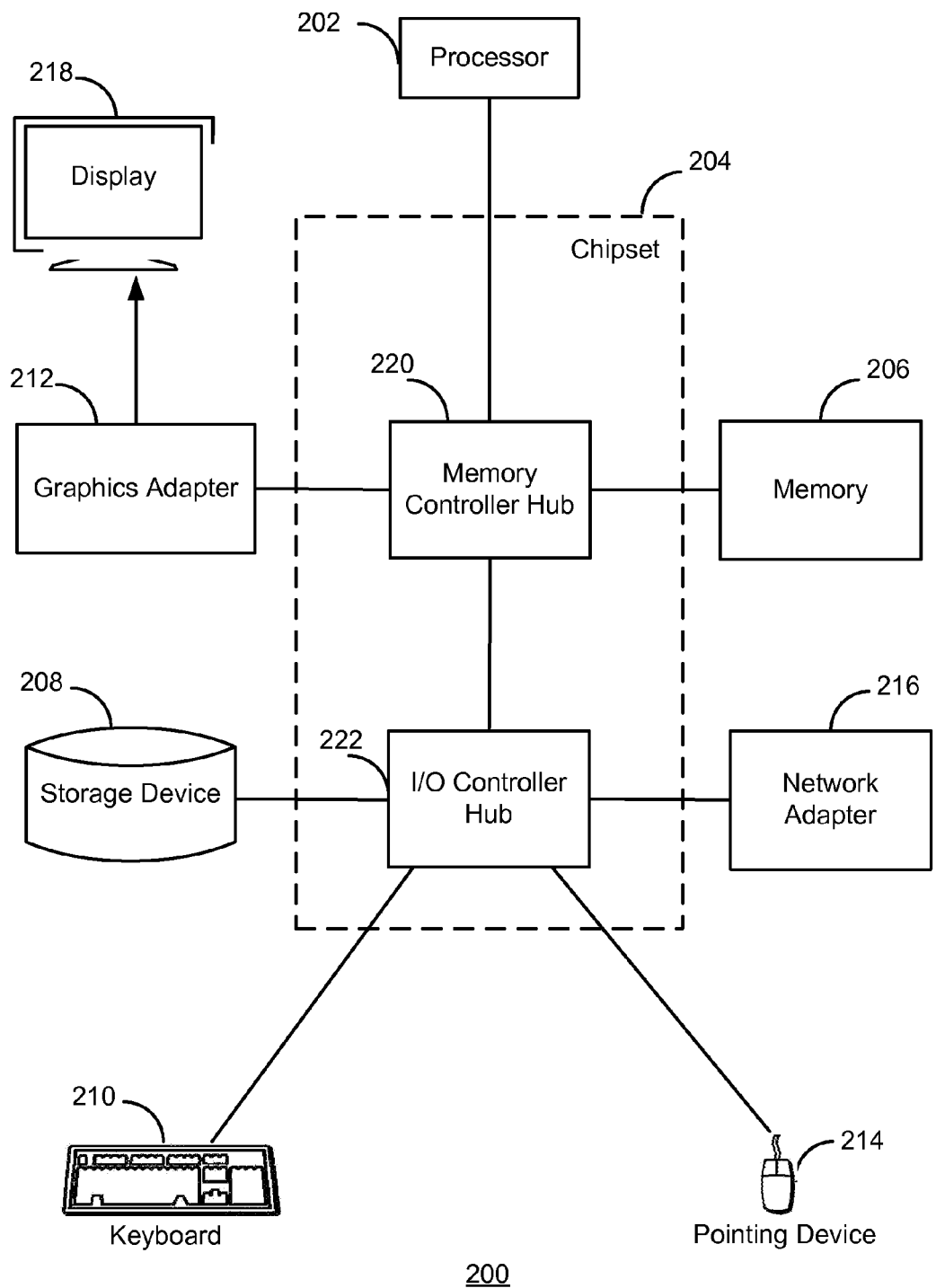
FIG. 2 is a high-level block diagram illustrating an example of a computer for use as a data conflation server, a map server, and/or a client, in accordance with one embodiment.

FIG. 2 is a high-level block diagram illustrating an example of a computer 200 for use as a data conflation server 112, a map server 114, and/or a client 116, in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 101. Some embodiments of the computer 200 have different and/or other components than those shown in FIG. 2. For example, the data conflation server 112 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
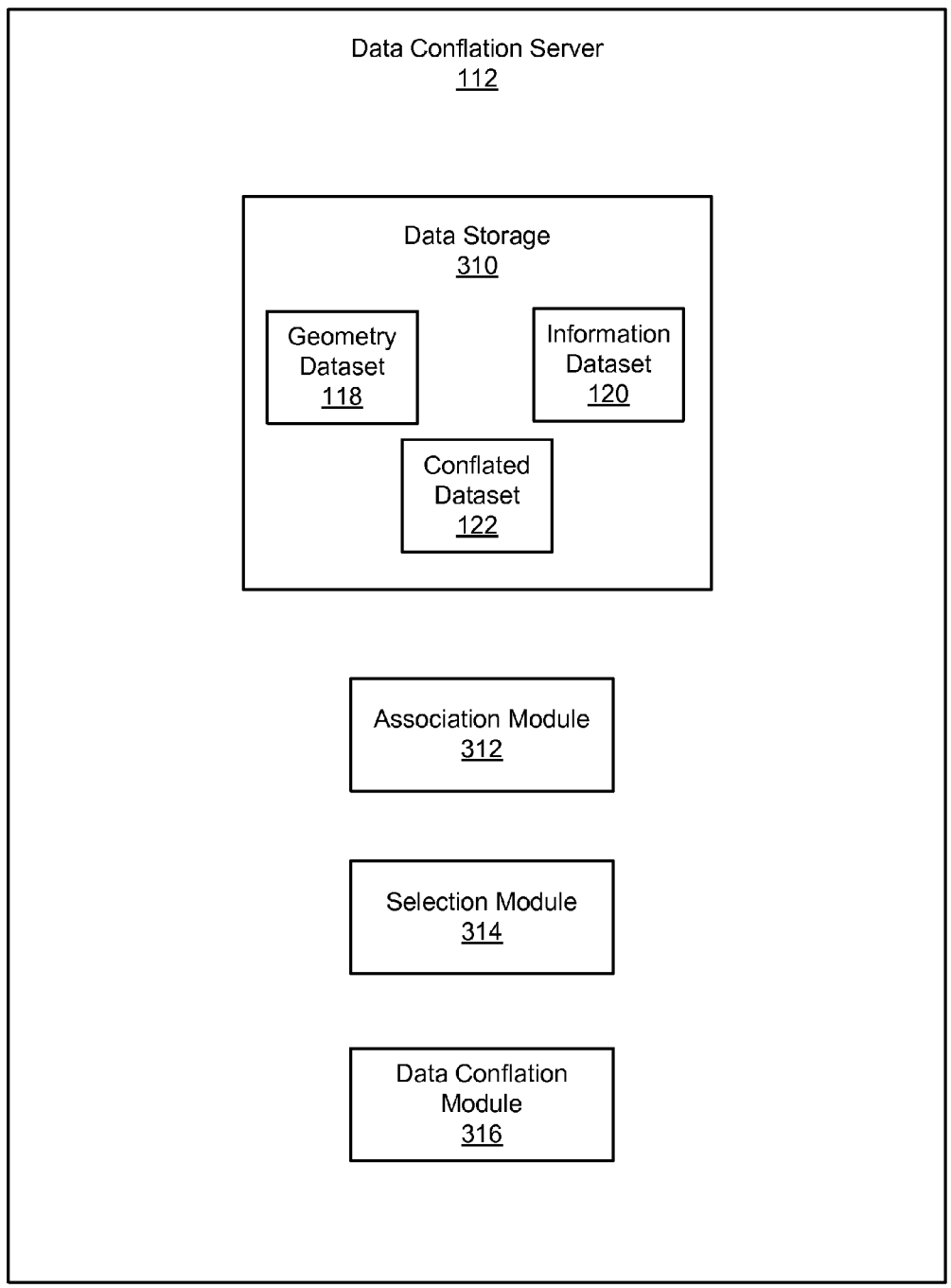
FIG. 3 is a high-level block diagram illustrating a detailed view of the data conflation server according to one embodiment.

FIG. 3 is a high-level block diagram illustrating a detailed view of the data conflation server 112 according to one embodiment. As shown in FIG. 3, the data conflation server 112 includes multiple modules. In some embodiments, the functions are distributed among the modules in a different manner than described herein. Moreover, the functions are performed by other entities in some embodiments, such as by the map data server 114.

A data storage module 310 stores the datasets, including the geometry 118, information 120, and conflated 122 datasets. The data storage module 310 can use a variety of techniques to store the data. For example, the data storage module 310 can include one or more relational and/or flat file databases. In addition, the data storage module 310 can access a remote storage device via the network 110 to retrieve remotely-stored data when such data are required by the data conflation server 112.

An association module 312 associates information features from the information dataset 120 with geometry features from the geometry dataset 118. In particular, for a given polygon describing the location of a geometry feature, the association module 312 identifies the zero or more information features having point locations that are bounded by (i.e., are located within) the polygon. In some embodiments, the set of information features also includes features having points that are not bounded by the polygon, but are located near an edge of the polygon.

The association module 312 thus identifies a set of geometry features and, for each geometry feature, an associated set of information features having points bounded by or near the geometry feature. An example of the output of the association module 312 is:

Geometry Feature A: Information Feature 1, Information Feature 2, Information Feature 3;

Geometry Feature B: Information Feature 6, Information Feature 7;

Geometry Feature C: Information Feature 8, Information Feature 9, Information Feature 11.

In this example, the points of information features 6 and 7 are located or within (or near) the polygon of geometry feature B.

A selection module 314 analyzes the output of the association module 312 to select information features that correspond to geometry features. Specifically, for a given geographic feature having a location described by a polygon of a geometry feature (e.g., Geometry Feature B) and an associated set of information features having points bounded by or near the polygon (e.g., Points 6 and 7), the selection module 314 selects the information feature that describes the same geographic feature as the geometry feature. The selection module 314 selects the information feature based on a comparison of the metadata of the geometry feature with the metadata of the information features in the set. The information feature having metadata that corresponds with the geometry feature is selected.

The heuristics used by the selection module 314 to select the matching information feature can vary in different embodiments. In one embodiment the selection module 314 uses a "type" characteristic described by the metadata to perform the selecting. The selection module 314 uses the metadata for the geometry feature in the geometry dataset 118 to identify the type of geographic feature (e.g., canal, river, lake). The selection module 314 also examines the type characteristics of the metadata for the associated set of information features to identify an information feature having the same type characteristic. If an information feature has the same characteristic (e.g., both the geometry and information features are of type "canal"), then the information feature is selected.

If multiple information features have the same type characteristic as the geometry feature, an embodiment of the selection module 314 uses other characteristics described by the metadata to select the information feature. For example, the selection module 314 can use a scoring system that assigns scores to the information features based on similarity between the features' metadata and the geometry feature's metadata, and select the highest-scoring information feature.

Further, one embodiment of the selection module 314 flags the geometry feature and its associated information features for human review if it cannot automatically select an information feature. The selection module 314 creates a data marker that identifies the geometry feature and its associated information features to allow a human operator to manually review the data. In one embodiment, the selection module 314 creates a list of flagged locations and also adds a visible cue, such as a small red flag, to the map of the geographic region identifying the geometry and information features flagged for manual review. A human user can use a map editing client (not shown in the figures) to review the map of the region having the geometry and information features, and possibly other information on the map, to manually identify the geometry and information features to conflate. In addition, the human user can use the map editing client to perform other tasks such as revising the location information and editing the metadata.

A data conflation module 316 conflates the geometry feature with the selected information feature. As mentioned above, the data conflation module 316 conflates the features by forming a conflated dataset 122 that reflects the strengths of the constituent datasets, where location information and metadata that are more accurate and/or more precise are considered "stronger." Thus, the data conflation module 316 evaluates the geometry feature and the selected information feature and, for a given characteristic, includes the more accurate/precise description of that characteristic in the conflated dataset 122. Since a geometry feature describes the location of the geographic feature with high precision but lacks detailed metadata and an information feature contains detailed metadata but poor location data, the data conflation module 316 conflates the data by combining the location information from the geometry feature with the metadata from the information feature. Other embodiments of the data conflation module 316 conflate the data using different techniques. The data conflation module 316 stores the conflated dataset 122 in the data storage module 310.

Figure 4:
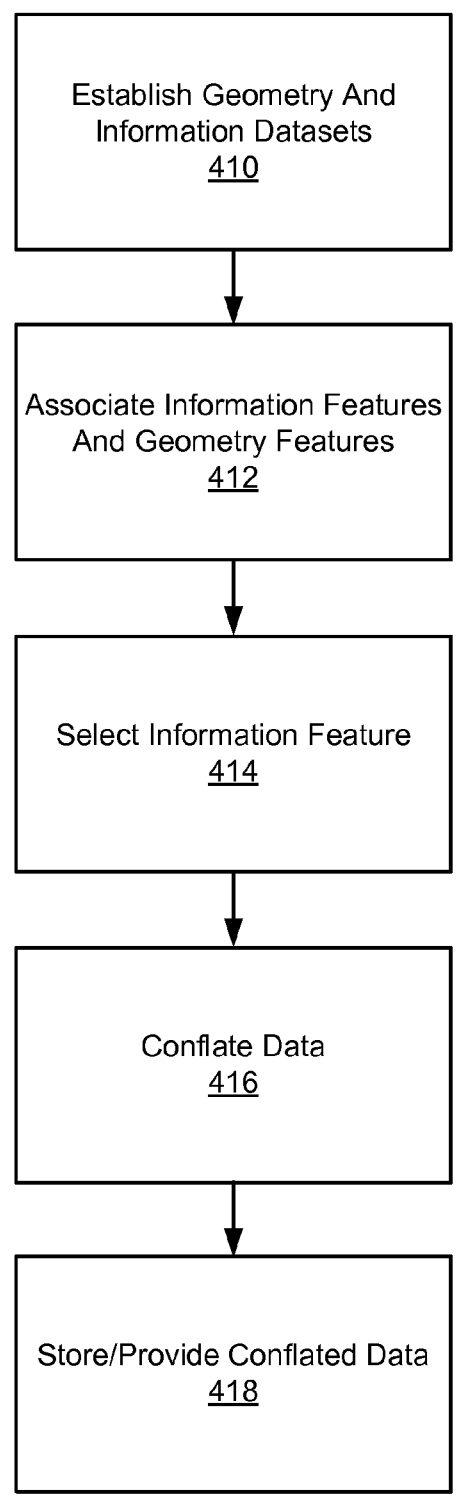
FIG. 4 is a flowchart illustrating a method of conflating data performed by the data conflation server according to one embodiment.

FIG. 4 is a flowchart illustrating a method of conflating data performed by the data conflation server 112 according to one embodiment. Other embodiments can perform the steps in different orders and can include different and/or additional steps. In addition, some or all of the steps can be performed by entities other than the data conflation server 112.

The data conflation server 112 establishes 410 the geometry 118 and information 120 datasets. For example, the datasets can be established by storing versions of the datasets within the data conflation server 112 or providing the server with an indication of where the datasets are stored. As discussed earlier, the geometry dataset 118 describes locations of geographic features with high precision (e.g., with polygons) but contains relatively poor metadata describing the characteristics of the geographic features. The information dataset 120, in contrast, describes locations of geographic features with low precision (e.g., with points), but contains relatively good metadata describing the characteristics of the geographic features. The data conflation server 112 can store the datasets 118, 120 locally or remotely.

The data conflation server 112 associates 412 information features from the information dataset 120 with geometry features from the geometry dataset 118. For a given polygon of a geometry feature, the association module 312 identifies the information features having point locations that are bounded by or near the polygon. The data conflation server 112 thus identifies a geometry feature and an associated set of information features having points bounded by or near the geometry feature.

The data conflation server 112 selects 414 information features that correspond to geometry features. The data conflation server 112 examines the information features in the set associated with a geometry feature in order to identify an information feature having metadata that matches the metadata of the geometry feature. For example, in one embodiment the data conflation server 112 selects 414 an information feature that has the same "type" characteristic as the geometry feature. If the data conflation server 112 cannot determine the corresponding information feature, it flags the geometry feature for manual review.

The data conflation server 112 conflates 416 the geometry features with the selected information features. In one embodiment, the data conflation server 112 performs the conflation 416 by combining the polygon describing the location of the geographic feature specified by the geometry feature with the metadata describing the characteristics of the geographic feature specified by the selected information feature. The data conflation server 112 stores 418 the conflated data as a conflated dataset 122. The conflated data can be used, for example, within map data served to clients 116.

Figure 5:
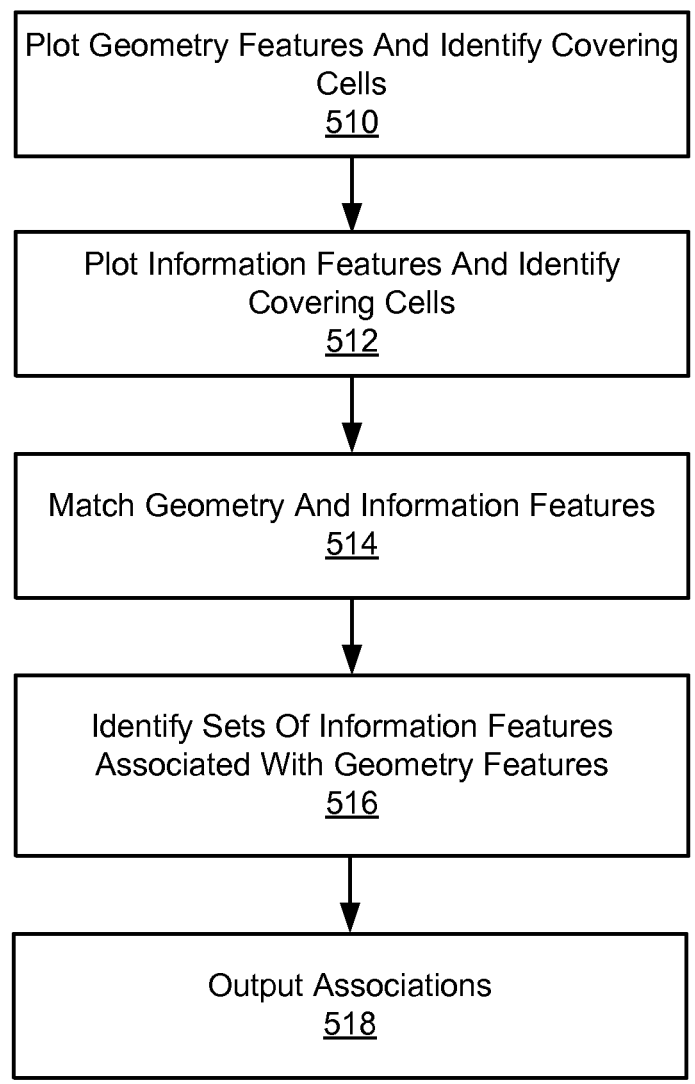
FIG. 5 is a flowchart illustrating a method of associating information features with geometry features according to one embodiment.

FIG. 5 is a flowchart illustrating a method of associating information features with geometry features according to one embodiment. The steps of FIG. 5 generally correspond to step 412 of FIG. 4 and are performed by the association module 312 of the data conflation server 112. Other embodiments can perform the steps in different orders and can include different and/or additional steps. In addition, some or all of the steps can be performed by entities other than the association module 312.

In some embodiments, the geometry 118 and information 120 datasets describe large numbers of geographic features. Therefore, it is impractical to perform a direct comparison of all information features to all geometry features because it would consume an inordinate amount of computational resources. Accordingly, an embodiment of the association module 312 uses techniques that are optimized for computational efficiency and to enable parallel processing.

In one embodiment, the geographic region on which the geographic features are located is described using a quadtree data structure having a set of hierarchically-nested cells. The geographic region can be, for example, a large geographic area such as a continent or country on the Earth. The cell at the top level of the hierarchy encompasses the entire region. Each cell at a level in the hierarchy is partitioned in two dimensions to form four cells at the next-lower level of the hierarchy that each encompass a smaller portion of the geographic region. In one embodiment, there are 30 levels of cells, which the lowest level representing a region approximately a centimeter on a side. In addition, the cells in the quadtree are warped to account for the curvature of the Earth.

The association module 312 plots 510 boundaries of the geometry features in the geometry dataset 118 on the representation of the geographic region. That is, the association module 312 plots 510 the polygons of the individual geographic features described by the geometry dataset 118 on the cell-based representation of the geographic region. Then, the association module 312 examines the plotted boundaries to identify 510 the cells that cover the features. For example, if a geometry feature describes the borders of a lake, the association module 312 plots 510 the polygon describing the boundaries of the lake on the geographic region, and then identifies 510 the cells of the geographic region that cover the lake.

In one embodiment, the association module 312 uses cell sizes near the middle of the hierarchy when identifying 510 the cells that cover the geometry features. For example, if the hierarchy is 30 levels deep, the association module 312 can use cells at levels 10 through 16 to cover the features. Cells at level 16 are roughly 100 meters per side in one embodiment, while the cells at levels 15 through 10 are larger. Further, the association module 312 can use a smaller cell if only a portion of the larger cell covers a geometry feature. For example, if the border of the lake covers only a corner of a cell at the $15^{th}$ level of the hierarchy, the association module 312 can identify a $16^{th}$ level cell as covering that portion of the lake rather than using the larger cell.

As part of the identification 510 process, the association module 312 generates a list of the identified cells. The list specifies the geometry features covered by each cell. For example, the list can resemble:

Cell 1: Geometry Feature A, Geometry Feature B;
Cell 2: Geometry Feature A, Geometry Feature D, Geometry Feature F In this example, Cell 1 covers geometry features A and B, and Geometry feature A is covered by Cells 1 and 2.

The association module 312 also plots 512 the points of the information features on the representation of the geographic region. Specifically, the association module 312 determines the point location specified for each geographic feature in the information dataset 120 and plots these points on the cell-based representation of the geographic region. Then, the association module 312 examines the plotted points to identify 512 the cells at a specified level of the hierarchy (e.g., at the $15^{th}$ level) that cover the points of the information features.

Furthermore, the association module identifies 512 a subset of cells higher in the hierarchy that overlap the cells in which the points of the information features are located. For example, if a given point resides in particular cell at level 16 of the hierarchy, the association module 312 identifies the level 16 cell and also identifies the cells at levels 15 through 10 of the hierarchy that overlap the level 16 cell. The association module 312 generates a list of the identified cells and the set of information features located within each cell.

In one embodiment the association module 312 adjusts the sizes of the points of the information features to tolerate minor discrepancies or errors in the locations of the points and/or polygons in the datasets 118, 120. The association module 312 uses a "tolerance" parameter specified by a user of the data conflation server 112 to indicate a margin by which a point is considered to be located in the cell, even if the point is truly not within that cell. In one embodiment, the tolerance parameter specifies a radius of a disk centered on the point of an information feature. The association module 312 uses the disk rather than the point when identifying 512 the cells that cover the points. Thus, any cell that covers a portion of the disk of an information feature is identified as containing that information feature. In one embodiment, the tolerance parameter is set to 100 meters.

The association module 312 uses the list of cells and geometry features and the list of cells and information features to match 514 geometry features with candidate information features. The association module 312 matches a geometry feature with all of the information features that reside in the same cell(s). These information features are considered candidates because they merely occur in the same cells as the matched geometry features, and not necessarily at overlapping geographic locations within the cells.

To understand this step, assume that the association module 312 identified cells containing geometry features as follows:

Cell 1: Geometry Feature A, Geometry Feature B;
Cell 2: Geometry Feature A, Geometry Feature D, Geometry Feature F.

Also assume that the association module 312 identified cells containing information features as follows:

Cell 1: Information Feature Q, Information Feature U;
Cell 2: Information Feature X, Information Feature Y.

In this example, geometry feature A is covered by cells 1 and 2. These cells also cover information features Q, U, X, and Y. Therefore, the association module 312 matches 514 geometry feature A with candidate information features Q, U, X, and Y. The association module 312 performs this matching for each geometry feature and thereby produces a set of zero or more candidate information features matching each geometry feature.

Next, the association module 312 analyzes the matching candidate information features to identify 518 the set of information features that are associated with each geometry feature. Specifically, for the polygon of given geometry feature, the association module 312 determines which of the candidate information features have points bounded by the polygon. Thus, if geometry feature A is matched with candidate information features Q, U, X, and Y, the association module 312 determines which of these information features have points bounded by geometry feature A's polygon. This determination is performed using computational geometry-based techniques. The information features having points bounded by geometry feature A's polygon are added to the set of information features associated with geometry feature A. The association module 312 can also use the tolerance parameter when evaluating whether a point is bounded by a polygon, in which case a point is considered bounded by the polygon if any portion of the disk having the radius described by the parameter falls within the polygon. The association module 312 outputs 518 the sets of information features that are associated with the geometry features, and other modules within the data conflation server 112 use the output to generate the conflated dataset 122.

The steps performed by the association module 312 can be parallelized and distributed among multiple computers or virtual computer instances. For example, the candidate information features for each geometry feature can be separately evaluated, thus allowing the processing tasks to be parallelized and distributed in an efficient manner. Other optimizations can be performed in other embodiments.

Although the above description primarily focuses on associating information features with geometry features, the same techniques can also be used to associate geometry features with information features. In other words, the associations can be bi-directional and the data conflation server 112 can identify thus the zero or more geometry features that cover each geometry feature. Moreover, in one embodiment, the data conflation server 112 flags anomalous issues detected based on information/geometry feature associations. For example, the data conflation server 112 can flag an information feature that is covered by two geometry features for human review.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of conflating data describing geographic features comprising:

establishing a first dataset describing geographic boundaries and a second dataset describing geographic features within a geographic region, each geographic feature associated with geographic coordinates;

identifying a set of geographic features of the second dataset associated with a geographic boundary of the first dataset, wherein identifying the set of geographic features comprises, for each of a plurality of geographic features of the second dataset:

plotting a geographic boundary included in the first dataset, plotting a disk having a center at a geographic coordinate associated with the geographic feature of the second dataset, and identifying the geographic feature as associated with the geographical boundary if at least a portion of the disk is bounded by the plotted geographic boundary;

in response to a determination that a subset of the set of geographic features is associated with geographic coordinates located within the geographic boundary, selecting a geographic feature from the subset of geographic features;

conflating data describing the selected geographic feature and data describing the geographic boundary to form conflated data; and storing the conflated data.

2. The method of claim 1, wherein establishing the first and second datasets comprises:

establishing a geometry dataset as the first dataset, the geometry dataset including geometry features describing geographic boundaries with a high level of precision; and establishing an information dataset as the second dataset, the information dataset including information features containing detailed information about geographic features and describing locations of geographic features with a low level of precision.

3. The method of claim 2, wherein a geometry feature in the geometry dataset describes a geographic boundary using a polygon and wherein an information feature in the information dataset describes the location of the geographic feature using a point defined by the geographic coordinates associated with the geographic feature.

4. The method of claim 2, wherein the identifying further comprises:

describing the geographic region using a set of cells;

plotting a geographic boundary included in the first dataset on the description of the geographic region;

identifying cells of the geographic region that cover the plotted geographic boundary;

plotting locations of information features included in the second dataset on the description of the geographic region;

identifying cells of the geographic region that cover the plotted locations of the information features; and analyzing the cells of the description of the geographic region that cover the plotted geographic boundaries and the plotted location of the information features to identify a set of information features that are associated with the geometry feature.

5. The method of claim 4, wherein analyzing the cells comprises:

identifying a cell of the geographic region that covers the plotted geographic boundary;

identifying information features having plotted locations within the identified cell; and associating information features having plotted locations within the identified cell with the geometry feature.

6. The method of claim 5, further comprising:
determining whether the plotted locations of information features within the identified cell are bounded by the plotted geographic boundary;
wherein an information feature is associated with the geometry feature if the plotted location of the information feature is bounded by the plotted geographic boundary of the geometry feature.

7. The method of claim 1, wherein selecting the geographic feature comprises:
comparing metadata of the geographic boundary with metadata of the subset of geographic features; and
selecting the geographic feature from the subset of geographic features responsive to the comparison of the metadata.

8. A non-transitory computer-readable storage medium storing executable computer program instructions for conflating data describing geographic features, the instructions performing steps comprising:
establishing a first dataset describing geographic boundaries and a second dataset describing geographic features within a geographic region, each geographic feature associated with geographic coordinates;
identifying a set of geographic features of the second dataset associated with a geographic boundary of the first dataset, wherein identifying the set of geographic features comprises, for each of a plurality of geographic features of the second dataset:
plotting a geographic boundary included in the first dataset,
plotting a disk having a center at a geographic coordinate associated with the geographic feature of the second dataset, and
identifying the geographic feature as associated with the geographical boundary if at least a portion of the disk is bounded by the plotted geographic boundary;
in response to a determination that a subset of the set of geographic features is associated with geographic coordinates located within the geographic boundary, selecting a geographic feature from the subset of geographic features;
conflating data describing the selected geographic feature and data describing the geographic boundary to form conflated data; and
storing the conflated data.

9. The computer-readable storage medium of claim 8, wherein establishing the first and second datasets comprises:
establishing a geometry dataset as the first dataset, the geometry dataset including geometry features describing geographic boundaries with a high level of precision; and
establishing an information dataset as the second dataset, the information dataset including information features containing detailed information about geographic features and describing locations of geographic features with a low level of precision.

10. The computer-readable storage medium of claim 9, wherein the identifying further comprises:
describing the geographic region using a set of cells;
plotting a geographic boundary included in the first dataset on the description of the geographic region;
identifying cells of the geographic region that cover the plotted geographic boundary;
plotting locations of information features included in the second dataset on the description of the geographic region;
identifying cells of the geographic region that cover the plotted locations of the information features; and
analyzing the cells of the description of the geographic region that cover the plotted geographic boundaries and the plotted location of the information features to identify a set of information features that are associated with the geometry feature.

11. The computer-readable storage medium of claim 10, wherein analyzing the cells comprises:
identifying a cell of the geographic region that covers the plotted geographic boundary;
identifying information features having plotted locations within the identified cell; and
associating information features having plotted locations within the identified cell with the geometry feature.

12. The computer-readable storage medium of claim 11, further comprising instructions for:
determining whether the plotted locations of information features within the identified cell are bounded by the plotted geographic boundary;
wherein an information feature is associated with the geometry feature if the plotted location of the information feature is bounded by the plotted geographic boundary of the geometry feature.

13. The computer-readable storage medium of claim 8, wherein selecting the geographic feature comprises:
comparing metadata of the geographic boundary with metadata of the subset of geographic features; and
selecting the geographic feature from the set responsive to the comparison of the metadata.

14. A computer system for conflating data describing geographic features, comprising:
a non-transitory computer-readable storage medium storing executable computer program instructions comprising instructions for:
establishing a first dataset describing geographic boundaries and a second dataset describing geographic features within a geographic region, each geographic feature associated with geographic coordinates;
identifying a set of geographic features of the second dataset associated with a geographic boundary of the first dataset, wherein identifying the set of geographic features comprises, for each of a plurality of geographic features of the second dataset:
plotting a geographic boundary included in the first dataset,
plotting a disk having a center at a geographic coordinate associated with the geographic feature of the second dataset, and
identifying the geographic feature as associated with the geographical boundary if at least a portion of the disk is bounded by the plotted geographic boundary;
in response to a determination that a subset of the set of geographic features is associated with geographic coordinates located within the geographic boundary, selecting a geographic feature from the subset of geographic features;
conflating data describing the selected geographic feature and data describing the geographic boundary to form conflated data; and
storing the conflated data; and
a processor for executing the computer program instructions.

15. The computer system of claim 14, wherein establishing the first and second datasets comprises:
  establishing a geometry dataset as the first dataset, the geometry dataset including geometry features describing geographic boundaries with a high level of precision; and
  establishing an information dataset as the second dataset, the information dataset including information features containing detailed information about geographic features and describing locations of geographic features with a low level of precision.

16. The computer system of claim 15, wherein the identifying further comprises:
  describing the geographic region using a set of cells;
  plotting a geographic boundary included in the first dataset on the description of the geographic region;
  identifying cells of the geographic region that cover the plotted geographic boundary;
  plotting locations of information features included in the second dataset on the description of the geographic region;
  identifying cells of the geographic region that cover the plotted locations of the information features; and
  analyzing the cells of the description of the geographic region that cover the plotted geographic boundaries and the plotted location of the information features to identify a set of information features that are associated with the geometry feature.

17. The computer system of claim 16, wherein analyzing the cells comprises:
  identifying a cell of the geographic region that covers the plotted geographic boundary;
  identifying information features having plotted locations within the identified cell; and
  associating information features having plotted locations within the identified cell with the geometry feature.

18. The computer system of claim 17, further comprising instructions for:
  determining whether the plotted locations of information features within the identified cell are bounded by the plotted geographic boundary;
  wherein an information feature is associated with the geometry feature if the plotted location of the information feature is bounded by the plotted geographic boundary of the geometry feature.

19. The computer system of claim 14, wherein selecting the geographic feature comprises:
  comparing metadata of the geographic boundary with metadata of the subset of geographic features; and
  selecting the geographic feature from the set responsive to the comparison of the metadata.

\* \* \* \* \*